US012240222B2

(12) United States Patent
Tani et al.

(10) Patent No.: US 12,240,222 B2
(45) Date of Patent: Mar. 4, 2025

(54) PRINTING SYSTEM

(71) Applicant: SCREEN HOLDINGS CO., LTD., Kyoto (JP)

(72) Inventors: Kazuma Tani, Kyoto (JP); Makoto Shiomi, Kyoto (JP); Yasunori Akiyoshi, Kyoto (JP)

(73) Assignee: SCREEN HOLDINGS CO., LTD., Kyoto (JP)

( * ) Notice: Subject to any disclaimer, the term of this patent is extended or adjusted under 35 U.S.C. 154(b) by 251 days.

(21) Appl. No.: 18/160,415

(22) Filed: Jan. 27, 2023

(65) Prior Publication Data

US 2023/0302822 A1 Sep. 28, 2023

(30) Foreign Application Priority Data

Mar. 24, 2022 (JP) ................................ 2022-048501

(51) Int. Cl.
*B41J 11/00* (2006.01)
*B41M 5/00* (2006.01)
*B65H 5/00* (2006.01)

(52) U.S. Cl.
CPC ........ *B41J 11/0015* (2013.01); *B41M 5/0017* (2013.01); *B65H 5/00* (2013.01); *B65H 2301/00* (2013.01)

(58) Field of Classification Search
CPC .... B41J 11/0015; B65H 5/00; B65H 2301/00; B41M 5/0017
See application file for complete search history.

(56) References Cited

U.S. PATENT DOCUMENTS

| | | | | |
|---|---|---|---|---|
| 2014/0253652 | A1* | 9/2014 | Ohba .................. | B41J 11/0015 347/101 |
| 2018/0037037 | A1 | 2/2018 | Takagi et al. | |
| 2020/0324543 | A1* | 10/2020 | Fisher .................... | B41F 35/04 |

FOREIGN PATENT DOCUMENTS

| | | | |
|---|---|---|---|
| JP | 2015-178230 | A | 10/2015 |
| JP | 2016-108105 | A | 6/2016 |
| JP | 2016-144895 | A | 8/2016 |

* cited by examiner

*Primary Examiner* — David H Banh
(74) *Attorney, Agent, or Firm* — Rimon P.C.

(57) ABSTRACT

A printing system includes a coating device, a printing device, and a controller. The coating device applies a processing liquid to a base material by bringing a coating roller with the processing liquid adhering thereto into contact with the transported base material. The printing device performs printing on a surface of the base material to which the processing liquid has been applied. The controller includes a contact-start-position identifier, an inappropriate-printing-area setter, and a print controller. The contact-start-position identifier identifies a contact start position of the base material in which the coating roller and the base material start to come in contact with each other. The inappropriate-printing-area setter sets, as the inappropriate printing area, an area of the base material that has a predetermined length in a transport direction from the contact start position. The print controller stops the printing device from performing printing on the inappropriate printing area.

10 Claims, 9 Drawing Sheets

PRINTING SYSTEM

RELATED APPLICATIONS

This application claims the benefit of Japanese Application No. 2022-048501, filed on Mar. 24, 2022, the disclosure of which is incorporated by reference herein.

BACKGROUND OF THE INVENTION

Field of the Invention

The present invention relates to a printing system including a coating device that applies a processing liquid to a base material.

Background Art

As printing systems employing an inkjet method, a printing system that includes a coating device is known in which, before printing of an image, a processing liquid such as an anchor coat for improving the surface wettability of a base material is applied to a surface of the base material.

For example, Japanese Patent Application Laid-Open No. 2016-108105A discloses a conventional printing system that includes a coating device for applying a processing liquid to the surface of a base material before printing of an image. The device disclosed in Japanese Patent Application Laid-Open No. 2016-108105 applies a processing liquid to the surface of paper 7 by causing a pressure roller 19 to press the paper 7 against a spreading roller 18 that is rotationally driven with a processing liquid deposited on its surface.

In the coating device, when a coating roller for applying the processing liquid is brought into contact with the base material, vibrations occur in the base material. The vibrations may cause unevenness in the coating of the processing liquid on the base material and may also create creases in the base material. Since the conventional printing system including the coating device performs printing also on an area in which unevenness in the coating of the processing liquid or creases in the base material have occurred, there is the problem that print quality may deteriorate.

SUMMARY OF THE INVENTION

Technical Problem

It is an object of the present invention to provide a technique for suppressing deterioration in print quality by avoiding printing from being performed on an area of a base material in which in which unevenness in the coating of a processing liquid or creases in the base material may occur.

Solution to Problem

To solve the problem described above, a first aspect of the present application is a printing system that includes a coating device that applies a processing liquid to a base material by bringing a coating roller into contact with the base material transported along a transport path, the coating roller having the processing liquid adhering thereto, a printing device that performs printing on a surface of the base material to which the processing liquid has been applied, and a controller that controls the printing device. The coating device includes a mover that moves the coating roller and the base material relative to each other between a separated position and a contact position, the separated position being a position in which the coating roller and the base material are not in contact with each other, the contact position being a position in which the coating roller and the base material start to come in contact with each other. The controller includes a contact-start-position identifier that identifies a contact start position of the base material in which the coating roller and the base material start to come in contact with each other, an inappropriate-printing-area setter that sets, as an inappropriate printing area, an area of the base material that has a predetermined length in a transport direction from the contact start position, and a print controller that stops the printing device from performing printing on the inappropriate printing area.

A second aspect of the present application is the printing system according to the first aspect, in which the coating device includes a storage that stores a predetermined numerical value about a length of the inappropriate printing area, and the inappropriate-printing-area setter sets the inappropriate printing area with reference to the numerical value.

A third aspect of the prevent application is the printing system according to the first aspect, in which the coating device includes a vibration sensor that detects a vibration occurring in the base material, and the inappropriate-printing-area setter sets the inappropriate printing area in accordance with a result of comparison between an output value of the vibration sensor and a predetermined first reference value.

A fourth aspect of the present application is the printing system according to the third aspect, in which the inappropriate-printing-area setter determines the first reference value in accordance with the output value of the vibration sensor when the coating roller and the base material are located in the separated position.

A fifth aspect of the present application is the printing system according to any one of the first to fourth aspects, in which the printing device includes a head that ejects ink to the surface of the base material to which the processing liquid has been applied, and a head mover that moves the head between a near-by position and a retracted position that is further away from the base material than the near-by position A sixth aspect of the present application is the printing system according to the fifth aspect, in which the head mover holds the head in the retracted position during a period in which the print controller stops the printing device from performing printing, and the head mover holds the head in the near-by position during a period in which the print controller releases the printing device from stopping performing printing.

A seventh aspect of the present application is the printing system according to the fifth aspect, in which the coating device includes a vibration sensor that detects a vibration occurring in the base material, and the head mover moves the head from the near-by position to the retracted position in accordance with a result of comparison between an output value of the vibration sensor and a predetermined second reference value.

An eighth aspect of the present application is the printing system according to the sixth or seventh aspect, in which the head mover completes movement of the head from the retracted position to the near-by position at the same time when a termination of the inappropriate printing area has passed under the head, and the print controller releases the printing device from stopping performing printing at the same time when the head has completed the movement from the retracted position to the near-by position.

A ninth aspect of the present application is the printing system according to any one of the first to eighth aspects, in which the processing liquid is an anchor coat.

A tenth aspect of the present application is the printing system according to any one of the first to ninth aspects that further includes a position sensor that detects a fact that the mover has completed relative movement of the coating roller from the separated position to the contact position. The contact-start-position identifier identifies the contact start position in accordance with a signal received from the position sensor.

According to the first to tenth aspects of the present application, it is possible to suppress deterioration in print quality by avoiding printing from being performed on an area of the base material in which unevenness in the coating of the processing liquid or creases in the base material may occur.

In particular, according to the fifth to eighth aspects of the present application, it is possible to reduce the possibility that the heads for ejecting gink may come in contact with the unevenness in the coating of the processing liquid or the creases in the base material.

In particular, according to the eighth aspect of the present application, it is possible to reduce the amount of the base material to be discarded.

These and other objects, features, aspects and advantages of the present invention will become more apparent from the following detailed description of the present invention when taken in conjunction with the accompanying drawings.

DESCRIPTION OF THE PREFERRED EMBODIMENTS

Hereinafter, preferable embodiments of the present invention will be described with reference to the drawings.

1. Configuration of Printing System

Figure 1:
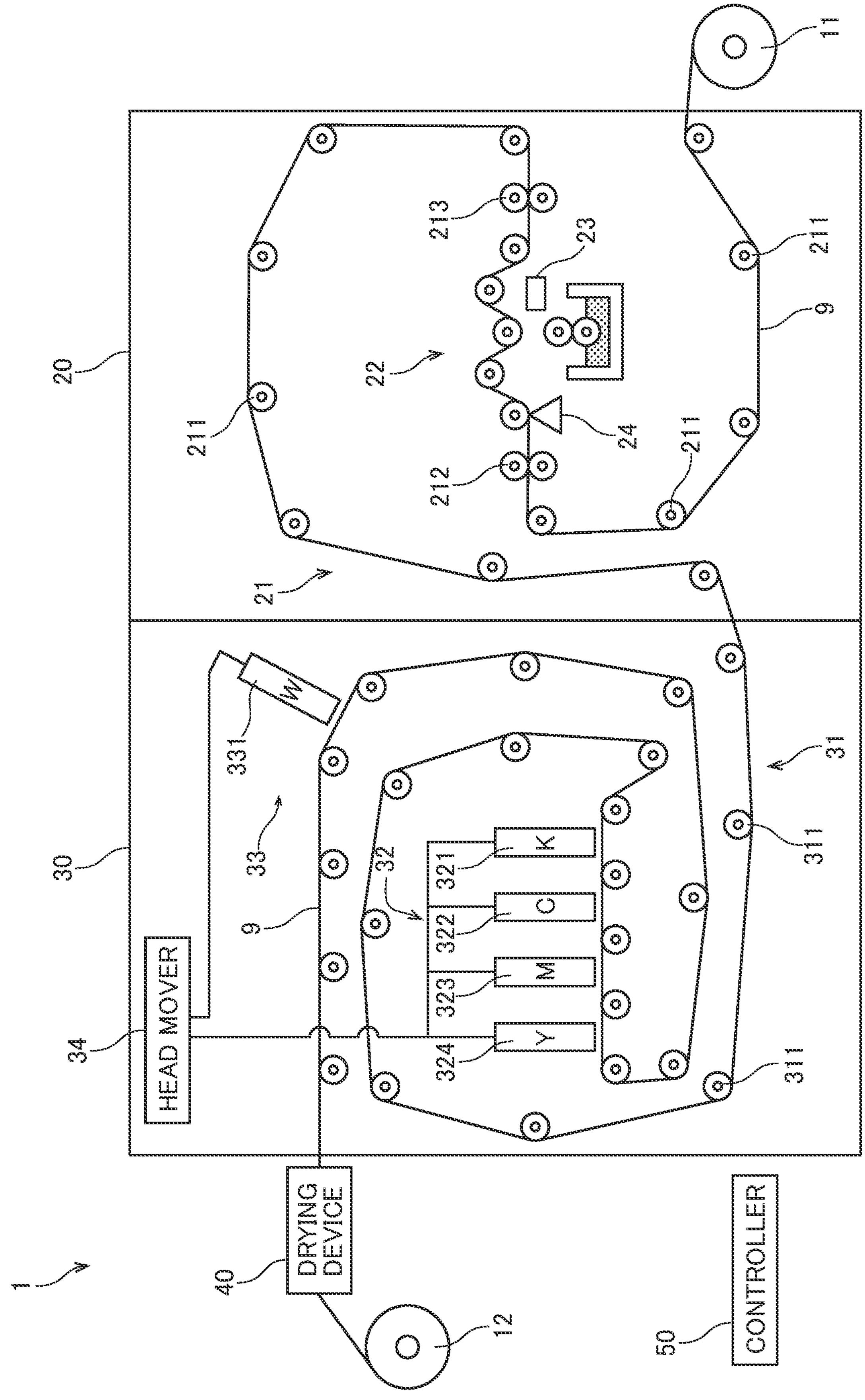
FIG. 1 is an illustration of a schematic configuration of a printing system.

First, an overall configuration of a printing system 1 according to one embodiment of the present invention will be described with reference to FIG. 1. FIG. 1 is an illustration of a schematic configuration of the printing system 1 for performing printing on a base material 9. This printing system 1 first performs a coating process on the surface of a long band-like base material 9 and then prints a multicolor image on the surface by an inkjet method while transporting the base material 9. As the base material 9, for example, resin film may be used, such as oriented polypropylene (OPP) or polyethylene terephthalate (PET). The printed base material 9 may be processed into, for example, labels of beverage PET bottles. Note that the base material 9 is not limited to resin film and may, for example, be a sheet of paper.

As illustrated in FIG. 1, the printing system 1 includes an unwinding part 11, a taking-up part 12, a coating device 20, a printing device 30, a drying device 40, and a controller 50.

The unwinding part 11 unwinds the base material 9 to the coating device 20. The base material 9 unwound out from the unwinding part 11 passes through the inside of the coating device 20, the printing device 30, and the drying device 40 and is then collected by the taking-up part 12.

1-1. Coating Device

The coating device 20 is a device that applies a processing liquid to the surface of the base material 9 transported out from the unwinding part 11. The coating device 20 includes a first transport mechanism 21, a coating mechanism 22, a position sensor 23, and a vibration sensor 24.

As the processing liquid, an anchor coat is used to improve the adhesion of ink to the base material 9 during print processing. The anchor coat improves the adhesion of ink to the base material 9 by increasing the surface wettability of the base material 9. Note that the processing liquid is not limited to the anchor coat and may, for example, be white ink.

The first transport mechanism 21 is a mechanism for transporting the base material 9 in a transport direction along the length of the base material 9 inside the coating device 20. The first transport mechanism 21 includes a plurality of transport rollers 211. The transport rollers 211 include first nip rollers 212 and second nip rollers 213.

The base material 9 unwound from the unwinding part 11 is transported along a transport path configured by the transport rollers 211. Each transport roller 211 rotates about a horizontal axis so as to guide the base material 9 downstream in the transport direction of the base material 9. The base material 9 runs under tension over the transport rollers 211. This suppresses generation of slack and creases in the base material 9 during transport.

The first nip rollers 212 and the second nip rollers 213 actively rotate at a constant speed while grasping the base material 9 from above and below in contact with the base material 9. The first transport mechanism 21 adjusts the rotational speed of the unwinding part 11 in response to the rotational speeds of the nip rollers 212 and 213. This gives tension to the base material 9. As a result, generation of slack and creases in the base material 9 is suppressed during transport.

Figure 2:
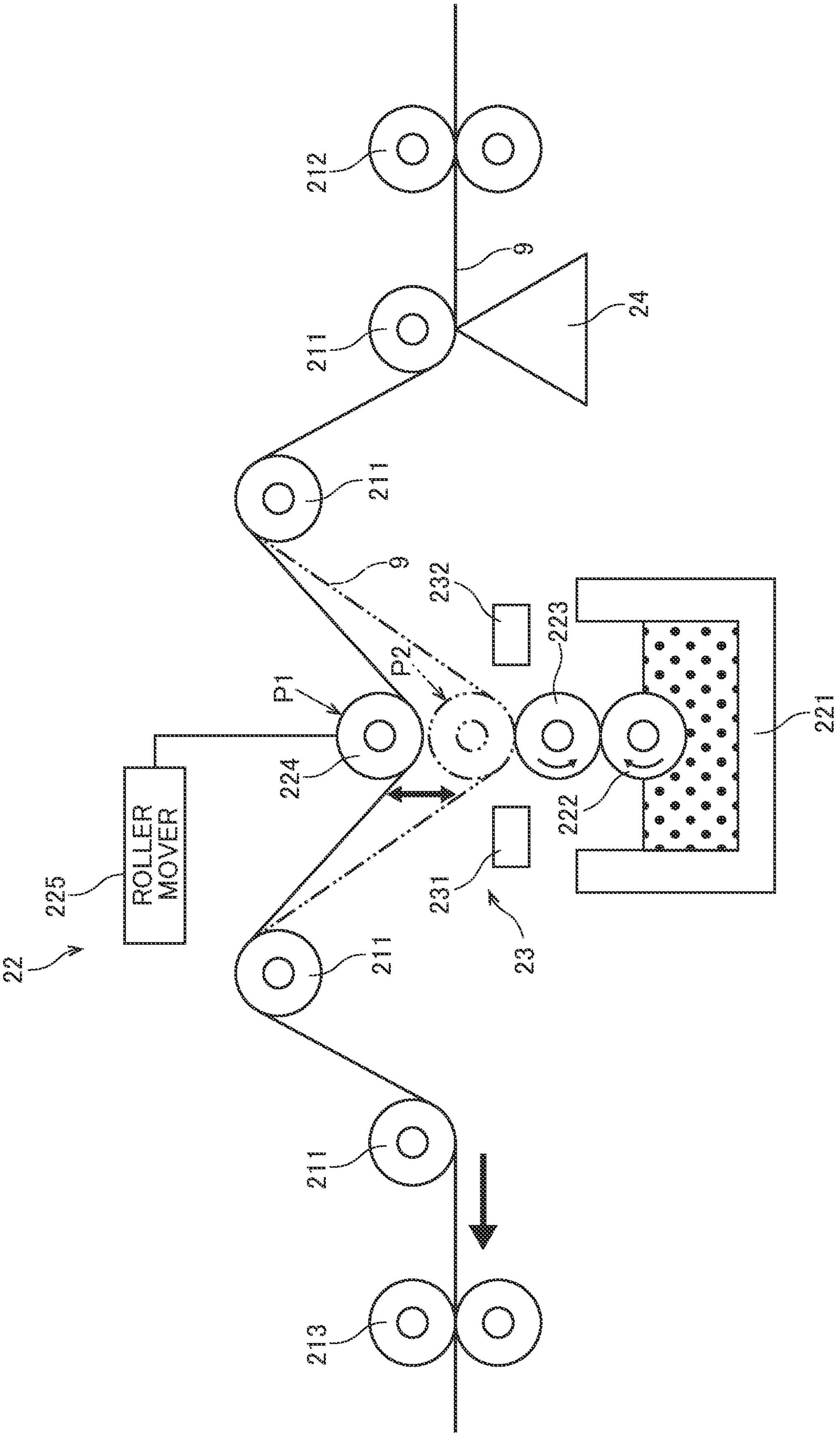
FIG. 2 is an enlarged view of a configuration of a coating device in the vicinity of a coating mechanism.

FIG. 2 is an enlarged diagram illustrating a configuration of part of the coating device 20 in the vicinity of the coating mechanism 22. The coating mechanism 22 is a mechanism for applying a processing liquid to the surface of the base material 9 transported by the first transport mechanism 21. The coating mechanism 22 is provided with the transport rollers 211 between the first nip rollers 212 and the second nip rollers 213. The coating mechanism 22 includes a processing-liquid reservoir 221, a processing-liquid transfer roller 222, a coating roller 223, a pressure roller 224, and a roller mover 225.

The processing-liquid reservoir 221 is a storage tank that stores the processing liquid therein. The processing-liquid reservoir has a rectangular parallelepiped shape that is open at the top. The processing-liquid transfer roller 222 is a cylindrical roller that supplies the processing liquid to the coating roller 223. The processing-liquid transfer roller 222 is located above the processing-liquid reservoir 221. At least part of the processing-liquid transfer roller 222 is immersed in the processing liquid stored in the processing-liquid reservoir 221.

The coating roller 223 is a roller that applies the processing liquid to the surface of the base material 9 transported to the coating mechanism 22 by the transport rollers 211. The coating roller 223 has a cylindrical shape and has its rotation axis fixed in parallel with the rotation axis of the processing-liquid transfer roller 222. The coating roller 223 is also fixed to the top of the processing-liquid transfer roller 222 such that the peripheral surface of the coating roller 223 is in contact with the peripheral surface of the processing-liquid transfer roller 222. The coating roller 223 is rotationally driven by a motor, which is not shown.

The pressure roller 224 is provided above the coating roller 223 so as to be movable upward and downward. The pressure roller 224 has a cylindrical shape and has its rotation axis arranged in parallel with the rotation axis of the coating roller 223. As illustrated in FIG. 2, the base material 9 transported to the pressure roller 224 is transported downstream while being in contact with the bottom of the pressure roller 224.

The roller mover 225 is mechanically connected to the pressure roller 224 as illustrated in FIG. 2. The roller mover 225 moves the pressure roller 224 between a separated position P1 and a contact position P2 in the space above the base material 9. In FIG. 2, the pressure roller 224 and the base material 9 when the pressure roller 224 is present in the separated position P1 are indicated by solid lines, and the pressure roller 224 and the base material 9 when the pressure roller 224 is present in the contact position P2 are indicated by chain double-dashed lines. As indicated by the solid lines in FIG. 2, the pressure roller 224 in the separated position P1 is separated by a predetermined distance from the coating roller 223. As indicated by the chain double-dashed lines in FIG. 2, the pressure roller 224 in the contact position P2 is in contact with the coating roller 223 via the base material 9. That is, in the contact position P2, the base material 9 is sandwiched from above and below by the coating roller 223 and the pressure roller 224.

Therefore, the separated position P1 is the position in which the coating roller 223 and the base material 9 are not in contact with each other. The contact position P2 is the position in which the coating roller 223 and the base material 9 are in contact with each other. The roller mover 225 is a relative mover that moves the base material 9 and the coating roller 223 relative to each other between the separated position P1 and the contact position P2.

Hereinafter, the coating process performed by the coating mechanism 22 will be described with reference to FIG. 2. First, the coating roller 223 is rotationally driven by the motor not shown. The processing-liquid transfer roller 222 rotates along with the rotation of the coating roller 223. Specifically, the processing-liquid transfer roller 222 rotates as a result of the contact portion of the processing-liquid transfer roller 222 with the coating roller 223 moving in the same direction as the direction of rotation of the coating roller 223.

The rotation of the processing-liquid transfer roller 222 causes the processing liquid stored in the processing-liquid reservoir 221 to be supplied to the entire peripheral surface of the processing-liquid transfer roller 222. Then, the processing liquid is supplied from the peripheral surface of the processing-liquid transfer roller 222 to the coating roller 223 via the contact portion of the processing-liquid transfer roller 222 and the coating roller 223, and adheres to the peripheral surface of the coating roller 223.

As indicated by the chain double-dashed lines in FIG. 2, the pressure roller 224 is moved from the separated position P1 to the contact position P2 by the roller mover 225. Accordingly, the contact portion of the base material 9 with the pressure roller 224 is also moved from the separated position P1 to the contact position P2 while being pulled by the pressure roller 224. When the pressure roller 224 has reached the contact position P2, the base material 9 is pressed against the peripheral surface of the coating roller 223 by the pressure roller 224. Accordingly, the processing liquid is transferred from the coating roller 223 to the base material 9 via the contact portion of the coating roller 223 and the base material 9, and the processing liquid is applied to the surface of the base material 9.

The processing-liquid transfer roller 222 continues to supply the processing liquid to the coating roller 223 insofar as the coating roller 223 is rotationally driven. Thus, the coating roller 223 continues to apply the processing liquid to the surface of the base material 9 insofar as the coating roller 223 and the base material 9 are in contact with each other. Hereinafter, a portion of the surface of the base material 9 to which the processing liquid has been applied is referred to as the "coated surface."

The position sensor 23 is a sensor that detects the position of the pressure roller 224. The position sensor 23 detects whether the pressure roller 224 is present in the contact position P2. By so doing, the position sensor 23 is capable of detecting the time when the coating roller 223 and the pressure roller 224 start to come in contact with each other.

For example, the position sensor 23 may use a photoelectric sensor to detect the position of the pressure roller 224. In this case, the position sensor 23 includes a projector 231 and a photodetector 232. As illustrated in FIG. 2, the projector 231 and the photodetector 232 are located slightly above the upper end of the coating roller 223. The projector 231 and the photodetector 232 are also provided at such a position that a straight line passing through the projector 231 and the photodetector 232 becomes parallel to the rotation axis of the coating roller 223. Therefore, when the pressure roller 224 is present at a position other than the contact position P2, the light emitted from the projector 231 enters the photodetector 232, and the photodetector 232 detects the light. On the other hand, when the pressure roller 224 is present in the contact position P2, the light emitted from the projector 231 is blocked by the pressure roller 224, and the amount of light reaching the photodetector 232 decreases. Accordingly, the position sensor 23 detects the position of the pressure roller 224 on the basis of the amount of light detected by the photodetector 232. Note that, instead of using such a transmission photoelectric sensor, the pressure sensor 23 may use, for example, a reflection photoelectric sensor or a CCD camera.

The vibration sensor 24 is a sensor that detects vibrations occurring in the base material 9 transported to the coating mechanism 22. In particular, the vibration sensor 24 detects vibrations occurring when the coating roller 223 comes in contact with the base material 9 in the coating process. The vibration sensor 24 is provided between the first nip rollers 212 and the coating mechanism 22. Alternatively, the vibration sensor 24 may be provided between the coating mechanism 22 and the second nip rollers 213. The vibration sensor 24 is in contact with the surface of the base material 9 transported on the transport path.

As the vibration sensor 24, for example, a piezoelectric sensor may be used. The vibration sensor 24 detects vibrations in the base material 9 by detecting fluctuations in the tension applied to the surface of the base material 9.

The processing liquid applied to the surface of the base material 9 is naturally dried as the base material 9 is transported downstream from the coating device 20 on the transport path. Thus, the base material 9 transported to the printing device 30 has a dried coated surface. Note that the coated surface of the coating device 20 may be dried by, for example, a heater. In this case, the coated surface can be dried more quickly and accordingly a uniform processing-liquid layer is formed on the surface of the base material 9. Accordingly, it is possible to improve print quality on the base material 9, achieved by the printing device 30.

1-2. Printing Device

The printing device 30 is a device that ejects droplets of ink toward the coated surface of the base material 9 transported to the printing device 30 by the transport mechanism. In this way, an image is printed on the coated surface of the base material 9. As illustrated in FIG. 1, the printing device 30 includes a second transport mechanism 31, a color printer 32, a white color printer 33, and a head mover 34.

The second transport mechanism 31 is a mechanism for transporting the base material 9 in the transport direction inside the printing device 30. The second transport mechanism 31 includes a plurality of transport rollers 311.

The base material 9 transported from the coating device 20 to the printing device is transported along a transport path configured by the transport rollers 311. Each transport roller 311 rotates about a horizontal axis so as to guide the base material 9 downstream along the transport path. The base material 9 runs under tension over the transport rollers 311. This suppresses generation of slack and creases in the base material 9 during transport.

The color printer 32 is a processing part that ejects droplets of ink (hereinafter, referred to as "ink droplets") to the base material 9 transported by the second transport mechanism 31. The color printer 32 includes a plurality of heads 321 to 324 above the transport path configured by the transport rollers 311. The heads 321 to 324 of the color printer 32 each have the lower surface provided with a plurality of nozzles arranged in parallel with the width direction of the base material 9. Note that the nozzles provided in the lower surface of each of the heads 321 to 324 of the color printer 32 may be arranged in a staggered format. Each head ejects ink droplets of one of the colors including K (black), C (cyan), M (magenta), and Y (yellow), which serve as color components of the multicolor image, from the nozzles toward the coated surface of the base material 9.

The first head 321 ejects K ink droplets to the coated surface of the base material 9. The second head 322 ejects C ink droplets to the coated surface of the base material 9. The third head 323 ejects M ink droplets to the coated surface of the base material 9. The fourth head 324 ejects Y ink droplets to the coated surface of the base material 9.

The white color printer 33 is a processing part that ejects white ink droplets to the base material 9 transported by the second transport mechanism 31. The white color printer 33 is provided downstream of the color printer 32. The white color printer 33 includes a fifth head 331 above the transport path. The fifth head 331 has the lower surface provided with a plurality of nozzles arranged in parallel with the width direction of the base material 9. Note that the nozzles provided in the lower surface of the fifth head 331 may be arranged in a staggered format. The fifth head 331 ejects W (white) ink droplets from the nozzles to the coated surface of the base material 9. After the image has been formed on the coated surface of the base material 9 by the color printer 32 and the white color printer 33, the base material 9 is transported from the printing device 30 to the drying device 40 by the second transport mechanism 31.

The head mover 34 is a mechanism for moving the heads 321 to 324 of the color printer 32 and the head 331 of the white color printer 33 in directions perpendicular to the base material 9 passing under the heads 321 to 324 and 331. The details of operations of the head mover 34 will be described later.

1-3. Drying Device

The drying device 40 is a device that dries the ink ejected to the coated surface of the base material 9. The drying device 40 is provided downstream of the printing device 30. The drying device 40 may dry the ink by, for example, spraying heated gas toward the base material 9 so as to vaporize a solvent in the ink adhering the base material 9. Alternatively, the drying device 40 may be configured to dry the ink by any other method such as photoirradiation.

The base material 9 dried by the drying device 40 is taken up on a roll by the taking-up part 12.

1-4. Controller

Figure 3:
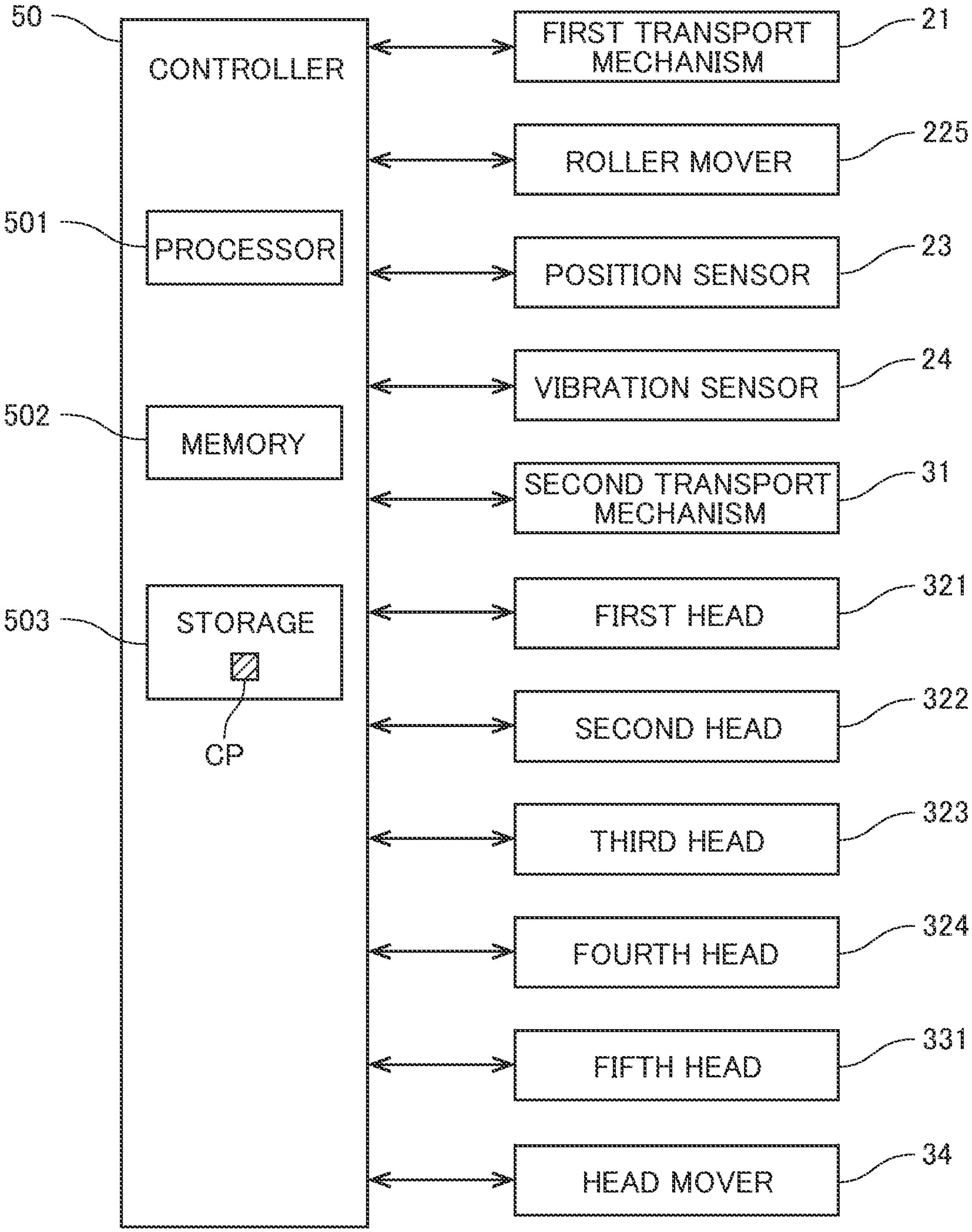
FIG. 3 is a block diagram illustrating connection between a controller and each component of the printing system.

The controller 50 is a processing part for controlling operations of each device included in the printing system 1. FIG. 3 is a block diagram illustrating the connection of the controller 50 with each component of the printing system 1. As schematically illustrated in FIG. 3, the controller 50 is configured as a computer that includes a processor 501 such as a CPU, a memory 502 such as a RAM, and a storage 503 such as a hard disk drive. The storage 503 stores a computer program CP. The controller 50 is also electrically connected to each of the above-described components including the first transport mechanism 21, the roller mover 225, the position sensor 23, the vibration sensor 24, the second transport mechanism 31, the heads 321 to 324 and 331, and the head mover 34. The controller 50 controls the operations of these components in accordance with the computer program CP. More specifically, the controller 50 controls the operations of each component by causing the processor 501 to temporarily read out the computer program CP stored in the storage 503 to the memory 502 and perform arithmetic processing in accordance with the computer program CP.

Figure 4:
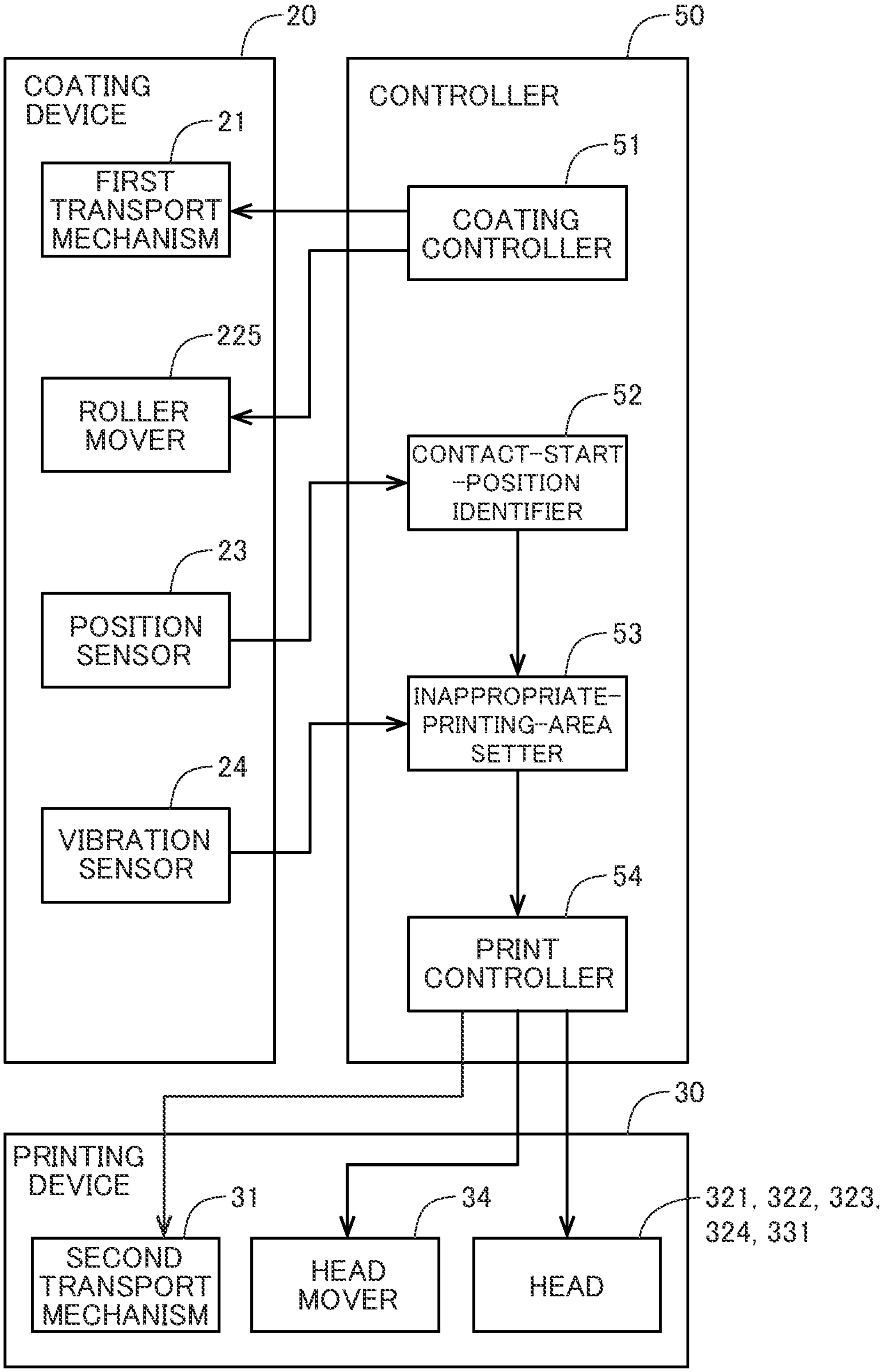
FIG. 4 is a block diagram schematically illustrating functions of the controller.

FIG. 4 is a block diagram schematically illustrating the functions of the aforementioned controller 50. As illustrated in FIG. 4, the controller 50 includes a coating controller 51, a contact-start-position identifier 52, an inappropriate-printing-area setter 53, and a print controller 54. The functions of the coating controller 51, the contact-start-position identifier 52, the inappropriate-printing-area setter 53, and the print controller 54 are achieved by the processor 501 of the controller 50 operating in accordance with the computer program CP.

The coating controller 51 controls the operation of applying the processing liquid to the base material 9 by the coating device 20. Specifically, the coating controller 51 controls the operation of transporting the base material 9 by the first transport mechanism 21 and the operation of moving the pressure roller 224 by the roller mover 225.

The contact-start-position identifier 52 identifies the position of the base material 9 in which the coating roller 223 and the base material 9 start to come in contact with each other. Hereinafter, the position of the base material 9 in which the coating roller 223 and the base material 9 start to come in contact with each other and that is identified by the contact-start-position identifier 52 is referred to as the "contact start position."

The inappropriate-printing-area setter 53 sets an area of the base material 9 that is inappropriate to the execution of print processing, on the basis of the result of identification by the contact-start-position identifier 52.

The print controller 54 controls the operation of performing printing on the coated surface of the base material 9 by the printing device 30. Specifically, the print controller 54 controls the operation of transporting the base material 9 by the second transport mechanism 31. The print controller 54 also controls the operation of ejecting ink by the heads 321 to 324 of the color printer 32 and the head 331 of the white color printer 33, on the basis of the area of the base material 9 that is inappropriate to the execution of print processing and that is set by the inappropriate-printing-area setter 53. The print controller 54 also controls the operation of moving the heads 321 to 324 and 331 by the head mover 34.

The details of the contents of processing performed by the contact-start-position identifier 52, the inappropriate-printing-area setter 53, and the print controller 54 will be described later.

2. Processing for Setting Inadequate Printing Area and Print Processing

Next is a description of the processing for setting the area of the base material 9 that is inappropriate to the execution of print processing and the print processing based on this area, performed by the above-described printing system 1.

As described above, the coating device 20 starts to perform the coating process on the surface of the base material 9 when the coating roller 223 comes in contact with the base material 9. Here, vibrations that are applied to the base material 9 by the contact of the coating roller 223 with the base material 9 are greater than vibrations that are applied to the base material 9 when the coating roller 223 is not in contact with the base material 9. Therefore, a layer of the processing liquid applied to the base material 9 becomes nonuniform. Therefore, unevenness in the coating of the processing liquid occurs in the surface of the base material 9 and also creases are generated in the base material 9 until the convergence of the vibrations caused by the contact of the coating roller 223 with the base material 9. If printing is performed on the area of the base material 9 in which creases or unevenness in the coating of the processing liquid have occurred, print quality may deteriorate.

In the following description, the area of the coated surface of the base material 9 that is regarded as being inappropriate to the execution of print processing due to the occurrence of creases or unevenness in the coating of the processing liquid, which has resulted from the increased vibrations applied to the base material 9 by the contact of the coating roller 223 with the base material 9, is referred to as the "inappropriate printing area A1."

For the reason described above, it is desirable that the printing system 1 avoid performing print processing on the inappropriate printing area A1. The following description is given of the detection of the inappropriate printing area A1 and the print processing that avoids the inappropriate printing area A1 by the printing system 1.

2-1. First Embodiment

Figure 5:
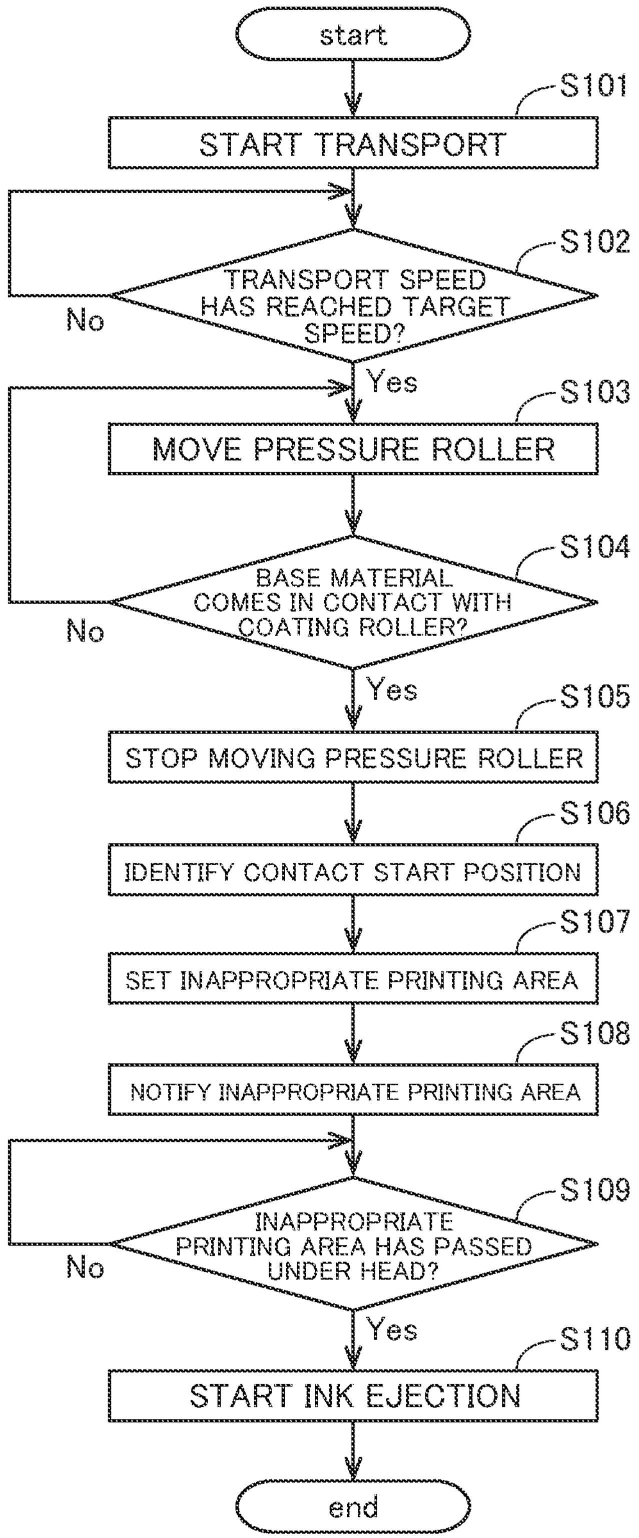
FIG. 5 is a flowchart illustrating a procedure of processing according to a first embodiment.

The following is a description of the setting of the inappropriate printing area A1 and the print processing that avoids the inappropriate printing area A1 by the printing system 1 according to a first embodiment. FIG. 5 is a flowchart illustrating a procedure of processing from when the printing system 1 starts print processing to when each of the heads 321 to 324 of the color printer 32 and the head 331 of the white color printer 33 starts to eject ink toward the coated surface of the base material 9 according to the first embodiment.

As illustrated in FIG. 5, first, the printing system 1 starts to transport the base material 9 by unwinding the base material 9 from the unwinding part 11 (step S101).

When the transport speed of the base material 9 has reached a predetermined target speed (Yes in step S102), the roller mover 225 moves the pressure roller 224 from the separated position P1 to the contact position P2 (step S103). When the pressure roller 224 has reached the contact position P2, the position sensor 23 transmits, to the coating controller 51 and the contact-start-position identifier 52, information indicating that the base material 9 and the coating roller 223 have come in contact with each other (Yes in step S104).

Then, the coating controller 51 stops the operation of the roller mover 225. In this way, the movement of the pressure roller 224 is stopped in the contact position P2 (step S105), and the coating of the base material 9 by the coating roller 223 is started.

Next, the contact-start-position identifier 52 identifies the position in which the base material 9 starts to come in contact with the coating roller 223, on the basis of the transport time from the start of transport of the base material 9 (step S101), the transport speed of the base material 9, and a signal received from the position sensor 23 (step S106). In the following description, the position in which the base material 9 starts to come in contact with the coating roller 223 is referred to as the "contact start position." The contact-start-position identifier 52 transmits information about the contact start position to the inappropriate-printing-area setter 53.

According to the first embodiment, the storage 503 stores, in advance, length data that indicates the length of the inappropriate printing area A1. The length data may, for example, be a predetermined numerical value determined by, for example, the model of the coating device 20, the model of the printing device 30, the type of the processing liquid, or the type of the base material 9. The inappropriate-printing-area setter 53 sets the inappropriate printing area A1 of the base material 9 by referencing the information about the contact start position and the length data about the inappropriate printing area A1 stored in the storage 503 (step S107). Specifically, the area that extends from the contact start position toward the rear end of the base material 9 and that has a length indicated by the length data is defined as the inappropriate printing area A1.

Next, the inappropriate-printing-area setter 53 notifies the print controller 54 of the inappropriate printing area A1 (step S108). While the inappropriate printing area A1 is passing under the heads 321 to 324 of the color printer 32 and the head 331 of the white color printer 33, the print controller 54 stops the heads 321 to 324 and 331 from ejecting ink. Thus, no image is printed on the inappropriate printing area A1.

Next, the print controller 54 calculates, for each head, the time when the termination of the inappropriate printing area A1 passes under each of the heads 321 to 324 and 331, in accordance with the contact start position, the transport speed of the base material 9, and the inappropriate printing area A1 notified from the inappropriate-printing-area setter 53. Then, at the same time when the inappropriate printing area A1 passes under each of the heads 321 to 324 and 331 (step S109: Yes), ink is ejected from each of the heads 321 to 324 and 331 in response to an instruction received from the print controller 54 (step S110). Note that steps S109 and S110 are performed for each of the heads 321 to 324 and 331.

As described above, this printing system 1 performs printing while avoiding the inappropriate printing area in which unevenness in the coating of the processing liquid or creases in the base material 9 may occur due to vibrations applied by the contact with the coating roller 223. This suppresses deterioration in print quality due to the contact with the coating roller 223.

2-2. Second Embodiment

Figure 6:
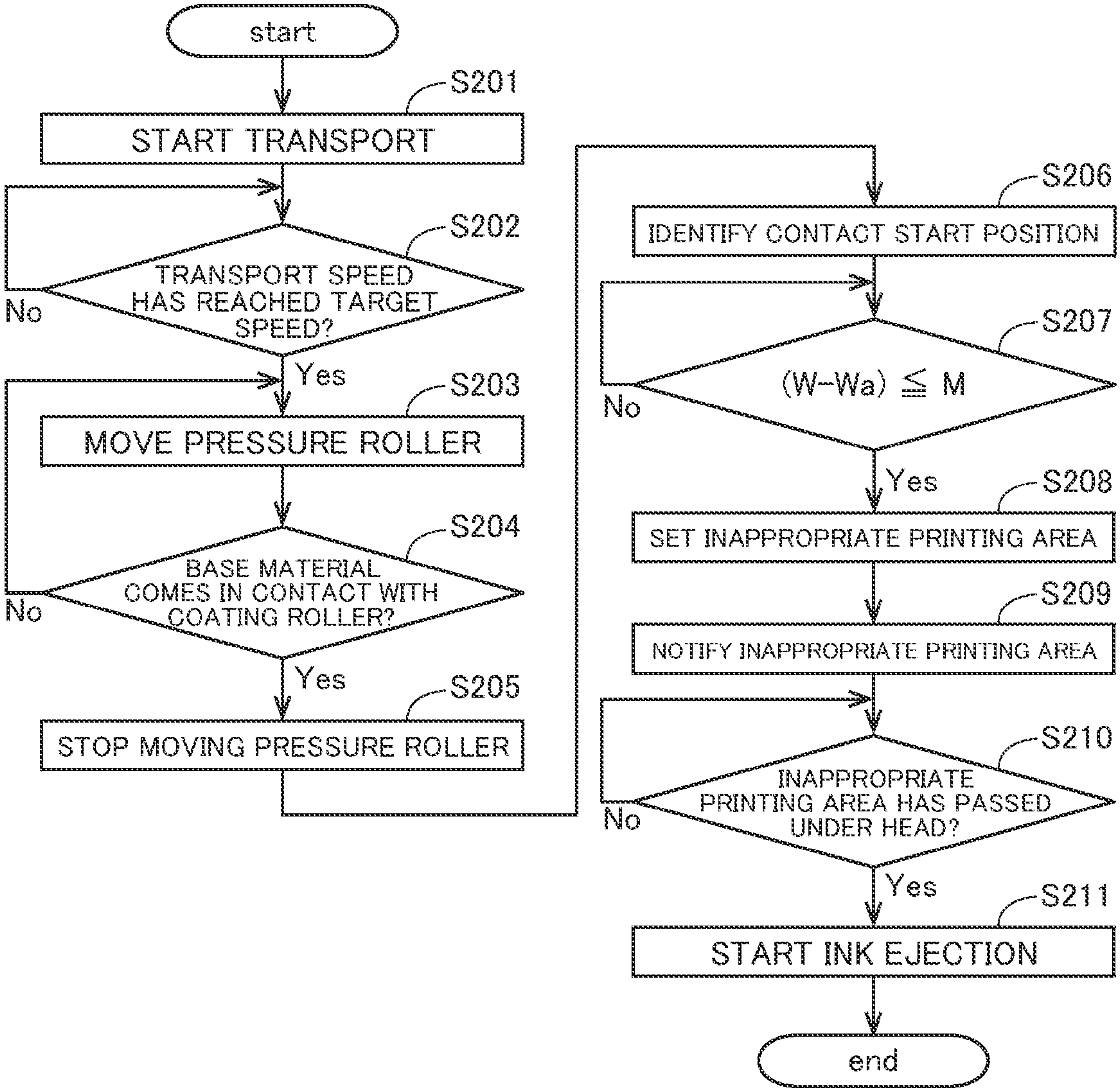
FIG. 6 is a flowchart illustrating a procedure of processing according to a second embodiment.

The following description is given of the setting of the inappropriate printing area A1 and the print processing that avoids the inappropriate printing area A1 by a printing system 1 according to a second embodiment. FIG. 6 is a flowchart illustrating a procedure of processing from when the printing system 1 starts print processing to when each of the heads 321 to 324 and 331 starts to eject ink to the coated surface of the base material 9 according to the second embodiment.

The storage 503 according to the second embodiment stores a predetermined reference value Wa about the output value of the vibration sensor 24. The reference value Wa may, for example, be a predetermined numerical value determined by, for example, the model of the coating device 20, the model of the printing device 30, the type of the processing liquid, or the type of the base material 9. Note that the "reference value Wa" corresponds to a "first reference value" according to the present invention.

Steps S201 to S206 in the process according to the second embodiment are similar to steps S101 to S106 according to the first embodiment, and therefore a description thereof shall be omitted.

After step S206, the coating roller 223 applies the processing liquid to the base material 9. During the application of the processing liquid, the vibration sensor 24 continues to transmit the output value W to the inappropriate-printing-area setter 53. Meanwhile, the inappropriate-printing-area setter 53 references the reference value Wa stored in the storage 503. Then, the inappropriate-printing-area setter 53 compares the reference value Wa with the output value W transmitted from the vibration sensor 24 for the base material 9 that is being transported. Then, when the difference between W and Wa becomes less than or equal to a predetermined margin M (Yes in step S207), the inappropriate-printing-area setter 53 sets a positon on the base material 9 that is in contact with the coating roller 223 as the termination of the inappropriate printing area A1 (step S208).

Steps S209 to S211 performed after step S208 according to the second embodiment are similar to steps S108 to S110 according to the first embodiment, and therefore a description thereof shall be omitted.

As described above, the second embodiment describes setting the inappropriate printing area A1 based on the output value W of the vibration sensor 24. This allows appropriate setting of the inappropriate printing area A1.

2-3. Third Embodiment

Figure 7:
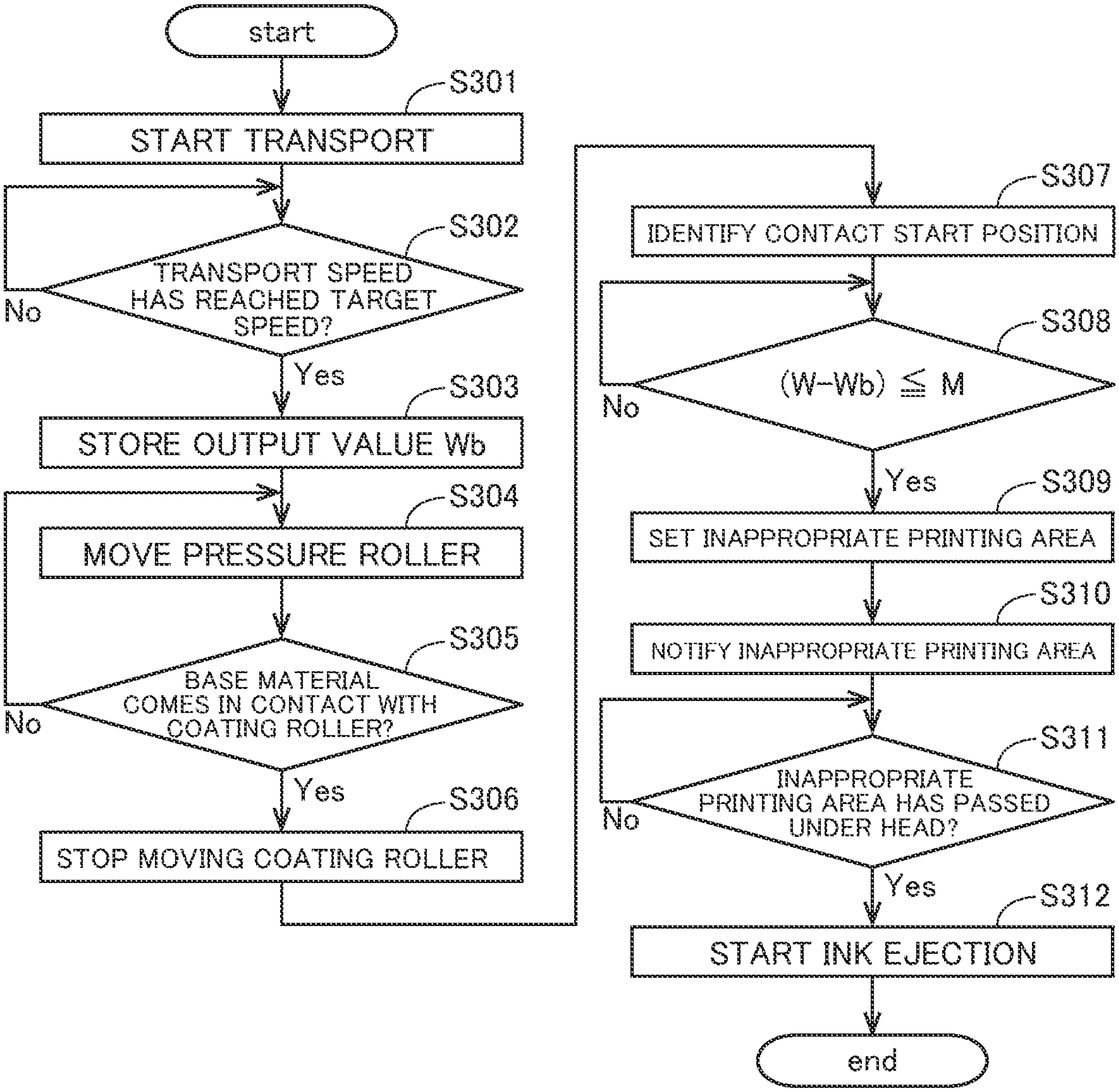
FIG. 7 is a flowchart illustrating a procedure of processing according to a third embodiment.

The following description is given of the setting of the inappropriate printing area A1 and print processing that avoids the inappropriate printing area A1 by a printing system 1 according to a third embodiment. FIG. 7 is a flowchart illustrating a procedure of processing from when the printing system 1 starts print processing to when each of the heads 321 to 324 and 331 starts to eject ink to the coated surface of the base material 9 according to the third embodiment.

Steps S301 and S302 in the process according to the third embodiment are similar to steps S101 and S102 according to the first embodiment, and therefore a description thereof shall be omitted.

After step S302, the vibration sensor 24 stores an output value Wb (step S303). The output value Wb indicates the degree of tension applied to the base material 9 when the pressure roller 224 is present in the separated position P1. The vibration sensor 24 transmits the output value Wb to the inappropriate-printing-area setter 53.

Steps S304 to S307 performed after step S303 according to the second embodiment are similar to steps S103 to S106 according to the first embodiment, and therefore a description thereof shall be omitted.

After step S307, the coating roller 223 applies the processing liquid to the base material 9. During the application of the processing liquid, the vibration sensor 24 continues to transmit an output value W to the inappropriate-printing-area setter 53. Meanwhile, the inappropriate-printing-area setter 53 defines the output value Wb transmitted from the vibration sensor 24 as a reference value Wb. Note that the "reference value Wb" corresponds to the "first reference value" according to the present invention.

Then, the inappropriate-printing-area setter 53 compares the reference value Wb with the output value W transmitted from the vibration sensor 24 for the base material 9 that is being transported. Then, when the difference between W and Wb becomes less than or equal to a predetermined margin M (Yes in step S308), the inappropriate-printing-area setter 53 defines a position on the base material 9 that is in contact with the coating roller 223 as the termination of the inappropriate printing area A1 (step S309).

Steps S310 to S312 performed after step S309 according to the second embodiment are similar to steps S108 to S110 according to the first embodiment, and therefore a description thereof shall be omitted.

As described above, the third embodiment describes setting the inappropriate printing area A1 based on the output value W of the vibration sensor 24. Moreover, the output value Wb of the vibration sensor 24 obtained when the pressure roller 224 is present in the separated position P1 is defined as the reference value Wb. This allows more appropriate setting of the inappropriate printing area A1.

2-4. Fourth Embodiment

The following description is given of the setting of the inappropriate printing area A1 and print processing that avoids the inappropriate printing area A1 by a printing system 1 according to a fourth embodiment. In the following description, an area of the coated surface of the base material 9 that is located rearward of the termination of the inappropriate printing area A1 is referred to as a "printable area A2."

According to the fourth embodiment, each of the heads 321 to 324 of the color printer 32 and the head 331 of the white color printer 33 is arranged in advance in a retracted position Q1 that is separated by a predetermined distance in a direction perpendicular to the base material 9 from the base material 9. Note that the distance between the retracted position Q1 and the base material 9 is greater than the distance between the base material 9 and the ejection position Q2 in which each of the heads 321 to 324 and 331 ejects ink toward the coated surface of the base material 9. Accordingly, it is possible to reduce the possibility that the heads 321 to 324 and 331 may come in contact with creases or unevenness in coating occurring in the inappropriate printing area A1 during transport of the base material 9. Note that the "retracted position Q1" corresponds to a "retracted position" according to the present invention. The "ejection position Q2" corresponds to a "near-by position" according to the present invention.

Moreover, the head mover 34 according to the fourth embodiment moves, at a predetermined specific time, each of the heads 321 to 324 and 331 from the retracted position Q1 to the ejection position Q2 in which the head ejects ink.

Figure 8:
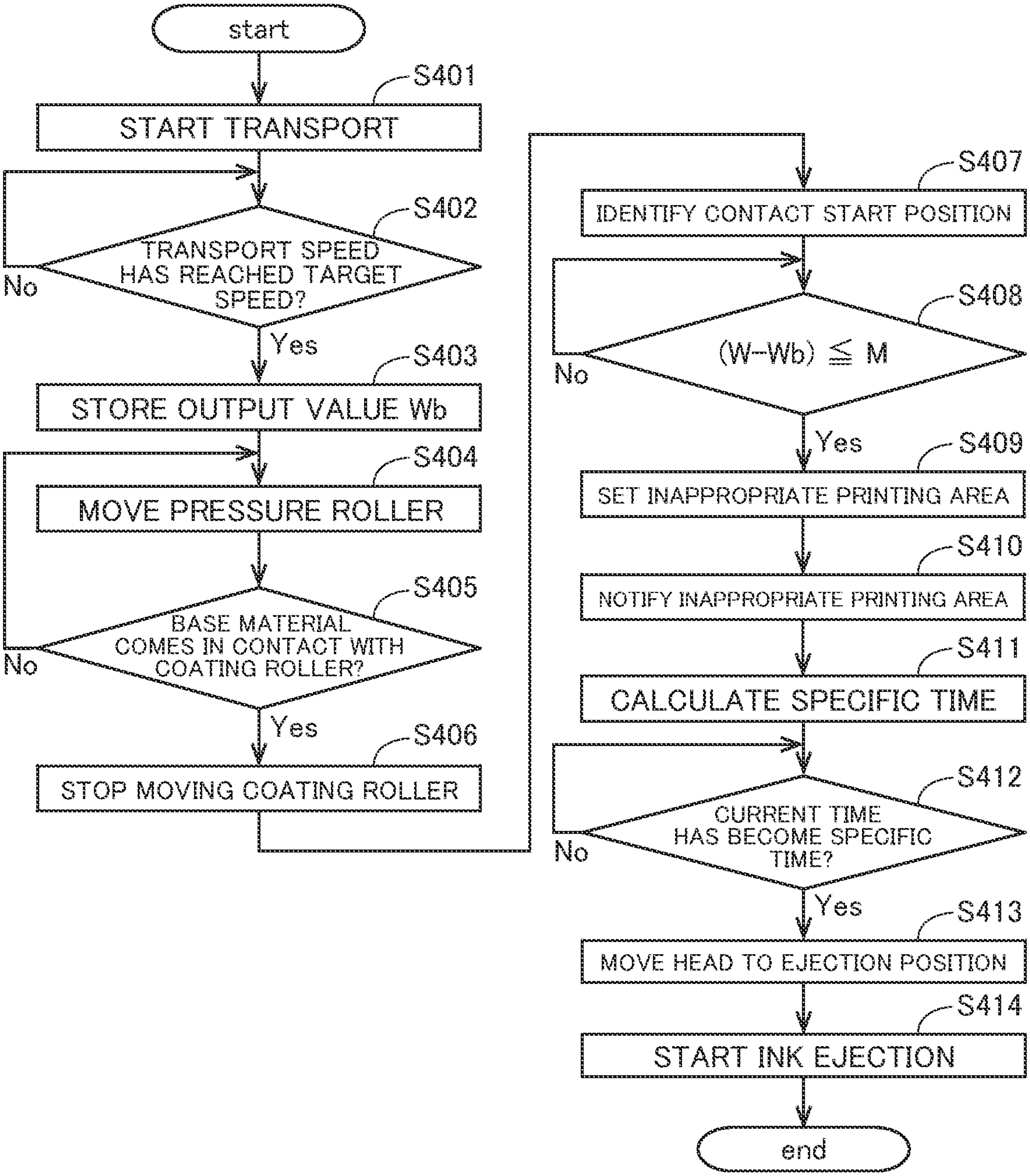
FIG. 8 is a flowchart illustrating a procedure of processing according to a fourth embodiment.

FIG. 8 is a flowchart illustrating a procedure of processing from when the printing system 1 starts print processing to when each head starts to eject ink to the coated surface of the base material 9 according to the fourth embodiment. Steps S401 to S410 in the process according to the fourth embodiment are similar to steps S301 to S310 according to the third embodiment, and therefore a description thereof shall be omitted.

After step S410, the print controller 54 calculates a predetermined specific time t for each of the heads 321 to 324 and 331 (step S411). The specific time t as used herein refers to such a time that the movement of each of the heads 321 to 324 and 331 from the retracted position Q1 to the ejection position Q2, which has been started at the specific time t, is completed at the same time when the termination of the inappropriate printing area A1 has passed under each of the heads 321 to 324 and 331. Note that specific times t1 to t5 are individually determined in one-to-one correspondence with the heads 321 to 324 and 331.

Figure 9:
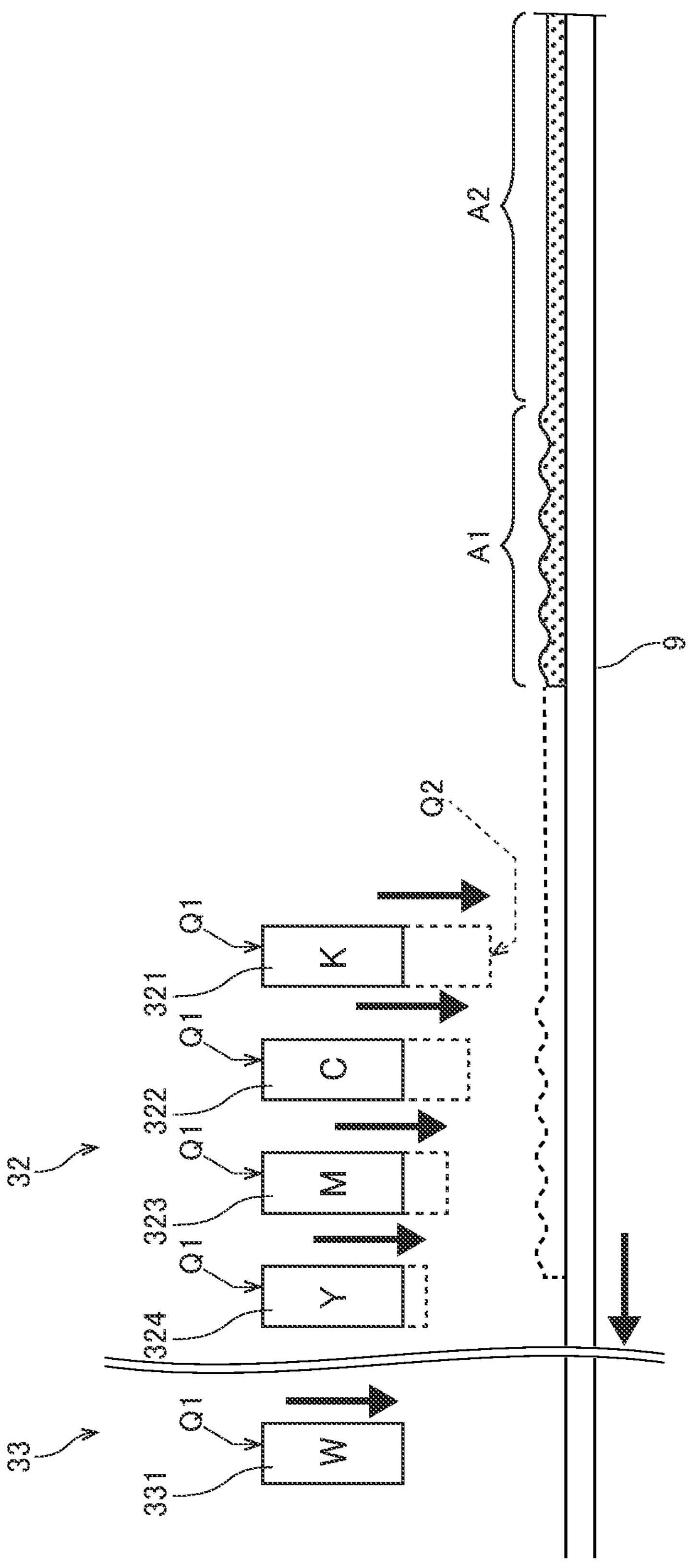
FIG. 9 is a schematic diagram illustrating how each head is moved and how a base material is transported.

FIG. 9 is a schematic view illustrating how each of the heads 321 to 324 and 331 is moved by the head mover 34 and how the base material 9 is transported. In FIG. 9, the positions of the heads 321 to 324 and 331, the inappropriate printing area A1, and the printable area A2 at the specific time t1, which corresponds to the first head 321, are indicated by solid lines. In FIG. 9, the positions of the heads 321 to 324 and 331, the inappropriate printing area A1, and the printable area A2 at a time when the first head 321 has reached the ejection position Q2 are indicated by broken lines.

For example, the specific time t1 is considered at which the first head 321 starts to move from the retracted position Q1 to the ejection position Q2. Before the specific time t1, the first head 321 is held in the retracted position Q1 as indicated by the solid line in FIG. 9. The heads 322 to 324 and 331 located downstream of the first head 321 are also held in the retracted position Q1.

When the current time has become the specific time t1, the first head 321 moves from the retracted position Q1 to the ejection position Q2. Then, at the same time when the termination of the inappropriate printing area A1 has passed under the head 321, the first head 321 reaches the ejection position Q2 as indicated by the broken line in FIG. 9. Upon arrival at the ejection position Q2, the first head 321 ejects ink to the coated surface of the base material 9. This allows the first head 321 to eject ink from the leading edge of the printable area A2.

The second head 322, the third head 323, the fourth head 324, and the fifth head 331 also eject ink to the coated surface of the base material 9 at the ejection position Q2 after they have moved from the retracted position Q1 to the ejection position Q2 when the current time has reached the calculated specific times t2 to t5, respectively.

In a subsequent process performed after the print processing by the printing system 1, the portion of the base material 9 that corresponds to the inappropriate printing area A1 and the portion of the printable area A2 to which ink has not been ejected are discarded. From this point of view, since the heads 321 to 324 and 331 according to the fourth embodiment are capable of starting ink ejection to the coated surface of the base material 9 from the leading edge of the printable area A2, it is possible to reduce the amount of the base material 9 to be discarded.

The print controller 54 may calculate the specific times t1 to t5 by, for example, using the value of the transport speed of the base material 9 and the position of the termination of the inappropriate printing area A1. Alternatively, instead of using the transport speed, the print controller 54 may use a signal that is output from an encoder provided on a predetermined roller of the printing system 1 to calculate the specific times t1 to t5. As another alternative, instead of using the transport speed, the print controller 54 may use a pulse signal that is input to a predetermined drive motor provided in the printing system 1 to calculate the specific times t1 to t5. As yet another alternative, instead of using the transport speed, the print controller 54 may use a predetermined parameter stored in advance in the storage 503 to calculate the specific times t1 to t5.

Let us now return to the description with reference to the flowchart illustrated in FIG. 8. When the current time has become each of the specific times t1 to t5 (Yes in step S412), the head mover 34 moves each of the heads 321 to 324 and 331 to the ejection position Q2 (step S413). Thereafter, each head that has completed the movement to the ejection position Q2 ejects ink to the coated surface of the base material 9 (step S414).

Note that steps S411 to S414 are performed independently for each of the heads 321 to 324 and 331.

3. Variations

While the embodiments of the present invention have been described thus far, the present invention is not intended to be limited to the embodiments described above.

3-1. First Variation

According to the first, second, and third embodiments described above, each of the heads 321 to 324 of the color printer 32 and the head 331 of the white color printer 33 is held in the ejection position Q2. However, if large vibrations occur in the base material 9 when each of the heads 321 to 324 and 331 is present in the ejection position Q2, each of the heads 321 to 324 and 331 may come in contact with unevenness in coating on the inappropriate printing area A1 or creases in the base material 9. In view of this, when large vibrations occur in the base material 9, the head mover 34 may move each of the heads 321 to 324 and 331 from the ejection position Q2 to the retracted position Q1.

According to a first variation, the vibration sensor 24 transmits the output value W not only to the inappropriate-printing-area setter 53 but also to the print controller 54. The storage 503 according to the first variation stores a predetermined reference value Wc. The reference value Wc has an upper limit value and a lower limit value. Note that the "reference value Wc" corresponds to a "second reference value" according to the present invention.

While the coating roller 223 is applying the processing liquid to the base material 9, the print controller 54 compares the reference value Wc stored in the storage 503 with the output value W output from the vibration sensor 24. When the output value W exceeds the upper limit value of the reference value Wc or when the output value W falls short of the lower limit value of the reference value Wc, the head mover 34 moves each of the heads 321 to 324 and 331 to the retracted position Q1. Accordingly, even if large vibrations have occurred in the base material 9, it is possible to reduce the possibility that each head comes in contact with creases or unevenness in coating occurring in the base material 9. Note that the head mover 34 may retract each of the heads 321 to 324 and 331 to a position other than the retracted position Q1.

When the output value W output from the vibration sensor 24 falls within the reference value Wc, the head mover 34 may move each of the heads 321 to 324 and 331 that has moved to the retracted position Q1 to the ejection position Q2. Alternatively, the head mover 34 may move each of the heads 321 to 324 and 331 that has moved to the retracted position Q1 to the ejection position Q2 through a process similar to steps S411 to S413 according to the fourth embodiment.

Thereafter, each of the heads 321 to 324 and 331 that has completed the movement to the ejection position Q2 ejects each color ink to the printable area A2 of the base material 9.

3-2. Other Variations

According to the above-described embodiments, the coating mechanism 22 includes one coating roller 223, and the roller mover 225 moves the one coating roller 223 relative to the base material 9 from the separated position P1 to the contact position P2. However, the coating mechanism 22 may include two coating rollers 223. Then, the roller mover 225 may move the base material 9 and the two coating rollers 223 relative to one another between the separated position P1 and the contact position P2.

According to the above-described embodiments, the roller mover 225 is mechanically connected to the pressure roller 224. Also, the roller mover 225 moves the pressure roller 224 between the separated position P1 and the contact position P2 in the space above the base material 9. However, the roller mover 225 may be connected to the processing-liquid reservoir 221, the processing-liquid transfer roller 222, and the coating roller 223, instead of the pressure roller 224. Then, the roller mover 225 may move the processing-liquid reservoir 221, the processing-liquid transfer roller 222, the coating roller 223 to the pressure roller 224.

According to the above-described embodiments, the roller mover 225 moves the pressure roller 224 between the separated position P1 and the contact position P2 in the space above the base material 9. Also, the coating controller 51 controls the operation of moving the roller mover 225. However, the pressure roller 224 may be manually moved by an operator.

According to the above-described embodiments, the contact-start-position identifier 52 identifies the contact start position of the base material 9 and the coating roller 223 by receiving a signal from the position sensor 23. However, the contact-start-position identifier 52 may identify the contact start position of the base material 9 and the coating roller 223 by receiving a control signal from the coating controller 51 to the roller mover 225.

According to the above-described embodiments, the vibration sensor 24 uses a piezoelectric sensor that detects fluctuations in the tension applied to the surface of the base material 9 as a change in voltage. However, the vibration sensor 24 may be a tension sensor that detects fluctuations in the tension applied to the base material 9. In the case where the tension sensor is used as the vibration sensor 24, the inappropriate-printing-area setter 53 sets the inappropriate printing area, assuming that a difference in tension between the maximum value and the minimum value per unit time is the value of fluctuations in the tension applied to the base material 9.

Each element used in the above-described embodiments and variations may be appropriately combined within a range that presents no contradictions.

While the invention has been shown and described in detail, the foregoing description is in all aspects illustrative and not restrictive. It is therefore understood that numerous modifications and variations can be devised without departing from the scope of the invention.

What is claimed is:

1. A printing system comprising:

a coating device that applies a processing liquid to a base material by bringing a coating roller into contact with the base material transported along a transport path, the coating roller having the processing liquid adhering thereto;

a printing device that performs printing on a surface of the base material to which the processing liquid has been applied; and a controller that controls the printing device, wherein the coating device includes:

a mover that moves the coating roller and the base material relative to each other between a separated position and a contact position, the separated position being a position in which the coating roller and the base material are not in contact with each other, the contact position being a position in which the coating roller and the base material start to come in contact with each other, and the controller includes:

a contact-start-position identifier that identifies a contact start position of the base material in which the coating roller and the base material start to come in contact with each other;

an inappropriate-printing-area setter that sets, as an inappropriate printing area, an area of the base material that has a predetermined length in a transport direction from the contact start position; and a print controller that stops the printing device from performing printing on the inappropriate printing area.

2. The printing system according to claim 1, wherein the coating device includes a storage that stores a predetermined numerical value about a length of the inappropriate printing area, and the inappropriate-printing-area setter sets the inappropriate printing area with reference to the numerical value.

3. The printing system according to claim 1, wherein the coating device includes a vibration sensor that detects a vibration occurring in the base material, and the inappropriate-printing-area setter sets the inappropriate printing area in accordance with a result of comparison between an output value of the vibration sensor and a predetermined first reference value.

4. The printing system according to claim 3, wherein the inappropriate-printing-area setter determines the first reference value in accordance with the output value of the vibration sensor when the coating roller and the base material are located in the separated position.

5. The printing system according to claim 1, wherein the printing device includes:

a head that ejects ink to the surface of the base material to which the processing liquid has been applied; and a head mover that moves the head between a near-by position and a retracted position that is further away from the base material than the near-by position.

6. The printing system according to claim 5, wherein the head mover holds the head in the retracted position during a period in which the print controller stops the printing device from performing printing, and the head mover holds the head in the near-by position during a period in which the print controller releases the printing device from stopping performing printing.

7. The printing system according to claim 5, wherein the coating device includes a vibration sensor that detects a vibration occurring in the base material, and the head mover moves the head from the near-by position to the retracted position in accordance with a result of comparison between an output value of the vibration sensor and a predetermined second reference value.

8. The printing system according to claim 6, wherein the head mover completes movement of the head from the retracted position to the near-by position at the same time when a termination of the inappropriate printing area has passed under the head, and the print controller releases the printing device from stopping performing printing at the same time when the head has completed the movement from the retracted position to the near-by position.

9. The printing system according to claim 1, wherein the processing liquid is an anchor coat.

10. The printing system according to claim 1, further comprising:

a position sensor that detects a fact that the mover has completed relative movement of the coating roller from the separated position to the contact position, wherein the contact-start-position identifier identifies the contact start position in accordance with a signal received from the position sensor.

* * * * *